United States Patent
Arnold et al.

(10) Patent No.: US 9,109,676 B2
(45) Date of Patent: Aug. 18, 2015

(54) ADJUSTING DRIVE

(75) Inventors: Jörg Arnold, Mermuth (DE); Gerd Mülhöfer, Laubach (DE)

(73) Assignee: Stabilus GmbH, Koblenz (DE)

( * ) Notice: Subject to any disclaimer, the term of this patent is extended or adjusted under 35 U.S.C. 154(b) by 722 days.

(21) Appl. No.: 13/223,074

(22) Filed: Aug. 31, 2011

(65) Prior Publication Data

US 2012/0256146 A1    Oct. 11, 2012

(30) Foreign Application Priority Data

Aug. 31, 2010    (DE) .................. 10 2010 036 036

(51) Int. Cl.
*B66F 3/08*    (2006.01)
*F16H 25/20*    (2006.01)

(52) U.S. Cl.
CPC ............ *F16H 25/20* (2013.01); *F16H 25/2015* (2013.01)

(58) Field of Classification Search
USPC ............................................. 254/93 A, 93 R
See application file for complete search history.

(56) References Cited

U.S. PATENT DOCUMENTS

| | | | | |
|---|---|---|---|---|
| 1,395,340 A | * | 11/1921 | Gormley | 254/103 |
| 1,396,858 A | * | 11/1921 | Lombard | 254/103 |
| 5,431,087 A | * | 7/1995 | Kambara | 92/146 |
| 6,377,010 B1 | * | 4/2002 | Roither | 318/560 |

FOREIGN PATENT DOCUMENTS

| | | |
|---|---|---|
| DE | 43 08 455 | 9/1994 |
| DE | 299 19 214 | 2/2000 |
| DE | 199 59 512 | 6/2001 |
| DE | 103 30 176 | 5/2004 |
| DE | 11 2005 002 9 | 9/2007 |
| EP | 0 203 362 | 12/1986 |

* cited by examiner

*Primary Examiner* — Lee D Wilson
*Assistant Examiner* — Shantese McDonald
(74) *Attorney, Agent, or Firm* — Cozen O'Connor

(57) ABSTRACT

An adjusting drive for adjusting a first structural component part relative to a second structural component part has a linear drive and a piston-cylinder unit connected in parallel with the linear drive for drive purposes. A control is provided for controlling the adjusting speed of the adjusting drive depending upon the adjusting path.

10 Claims, 2 Drawing Sheets

ADJUSTING DRIVE

BACKGROUND OF THE INVENTION

1. Field of the Invention

The invention is directed to an adjusting drive for adjusting a first structural component part relative to a second structural component part having a linear drive and a piston-cylinder unit connected in parallel with the linear drive for drive purposes.

2. Description of the Related Art

Adjusting drives of this type are well known and are used in various applications, for example, for the adjustment of hatches and doors in machinery and plant engineering, in vehicle engineering, in medical engineering, in the furniture industry, and in other fields of industry.

DE 299 19 214 U1 (corresponding to U.S. Pat. No. 6,377, 010 B1) discloses an adjusting drive for adjusting a first structural component part relative to a second structural component part, having a linear drive and a piston-cylinder unit connected in parallel with the linear drive for drive purposes.

Further, adjusting drives having a piston-cylinder unit in addition to a linear drive are known from DE 103 30 176 B4, DE 199 59 512 B4, and DE 11 2005 002 952 T5. Further, similar adjusting drives are known from EP 0 203 362 B1 and DE 43 08 455 A1.

SUMMARY OF THE INVENTION

It is an object of one embodiment of the invention to provide an adjusting drive for adjusting a first structural component part relative to a second structural component part, having a linear drive and a piston-cylinder unit connected in parallel with the linear drive for drive purposes constructed in a simple and economical manner and is usable in different applications.

One embodiment of the invention is based on the idea that it is necessary, or at least desirable, in various applications to change the adjusting speed over the course of the adjusting path. Proceeding from this idea, one embodiment of the invention provides a control for controlling the adjusting speed of the adjusting drive depending upon the adjusting path.

According to one embodiment of the invention, it is possible to control the adjusting speed along the adjusting path of the adjusting drive. For example, it is possible to increase the adjusting speed at the start of the adjusting path, then to keep the adjusting speed constant, and to reduce the adjusting speed again at the end of the adjusting path. On the one hand, this results in a gradual start; on the other hand, the structural component part to be adjusted comes to a stop gradually at the end of the adjusting path. This is advantageous particularly in applications in which a jerky starting and jerky stopping of the adjusting drive are undesirable.

The adjusting path-dependent speed profile of the adjusting speed can be selected within broad limits corresponding to the respective requirements.

By combining a linear drive with a piston-cylinder unit, a favorable force ratio results in the adjusting direction, for example, when opening a hatch, because the linear drive is reinforced by the piston-cylinder unit as force accumulator. Further, when a piston-cylinder unit is used as static force accumulator, optimal pressure forces are available in the start phase for adjusting the second structural component part relative to the first structural component part.

Another advantage of the invention is that the linear drive, for example, a spindle drive, can have smaller dimensions because the main burden is borne by the piston-cylinder unit during adjustment.

The piston-cylinder unit can have any suitable piston-cylinder arrangement; for example, it can be designed as a damper. However, the piston-cylinder unit is preferably a gas spring.

In one embodiment of the invention, the control has a pneumatic control. In this way, the control is designed in a simple and economical manner by dispensing with electric or electronic components.

In an advantageous further embodiment, the pneumatic control has at least one flow channel formed in the inner wall of a cylinder of the piston-cylinder unit. In this embodiment, the adjusting speed can vary within wide limits through a corresponding design of a flow channel or a plurality of flow channels. A particular advantage of this embodiment form consists in that the flow channel, or flow channels, can be incorporated in the cylinder during the production of same so that additional structural component parts are not required to this extent.

In an advantageous further development of the above-mentioned embodiment, the cross section of the flow channel changes at least partially in axial direction of the cylinder.

According to one embodiment flow channel has at least one groove. Corresponding grooves can be incorporated in the inner surface of the cylinder of the piston-cylinder unit in a simple manner during production.

To achieve a slow start of the adjusting drive, it is provided in an advantageous further development that the cross section of the flow channel increases at least partially in the region of the start of the adjusting path.

In another advantageous further development of the invention, the cross section of the flow channel decreases at least partially in the region of the end of the adjusting path so that the adjusting drive can come to a stop slowly at the end of the adjusting path.

In principle, it is sufficient, according to one embodiment of the invention, when the adjusting drive has one linear drive and one piston-cylinder unit. However, according to one embodiment of the invention, two or more linear drives and/or two or more piston-cylinder units can also be provided depending on the respective requirements.

The linear drive can be designed corresponding to the respective requirements. In an advisable further development of the invention, it is provided in this respect that the linear drive has a spindle drive. Spindle drives of this kind are available as simple, economical and robust standardized components.

In order to construct the adjusting drive in a particularly compact manner, a further development of the embodiment form mentioned above provides that a spindle of the spindle drive is constructed as a hollow spindle and that the piston-cylinder unit is arranged in the hollow spindle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully in the following with reference to the accompanying highly schematic drawings showing an embodiment example of an adjusting drive according to the invention. All of the features which are described, illustrated in the drawings, and claimed in the patent claims, per se or in any combination thereof, form the subject matter of the invention irrespective of their description or illustration in the drawings and irrespective of their synopsis in the patent claims and dependent claims. In the drawings:

DETAILED DESCRIPTION OF THE PRESENTLY PREFERRED EMBODIMENTS

Figure 1:
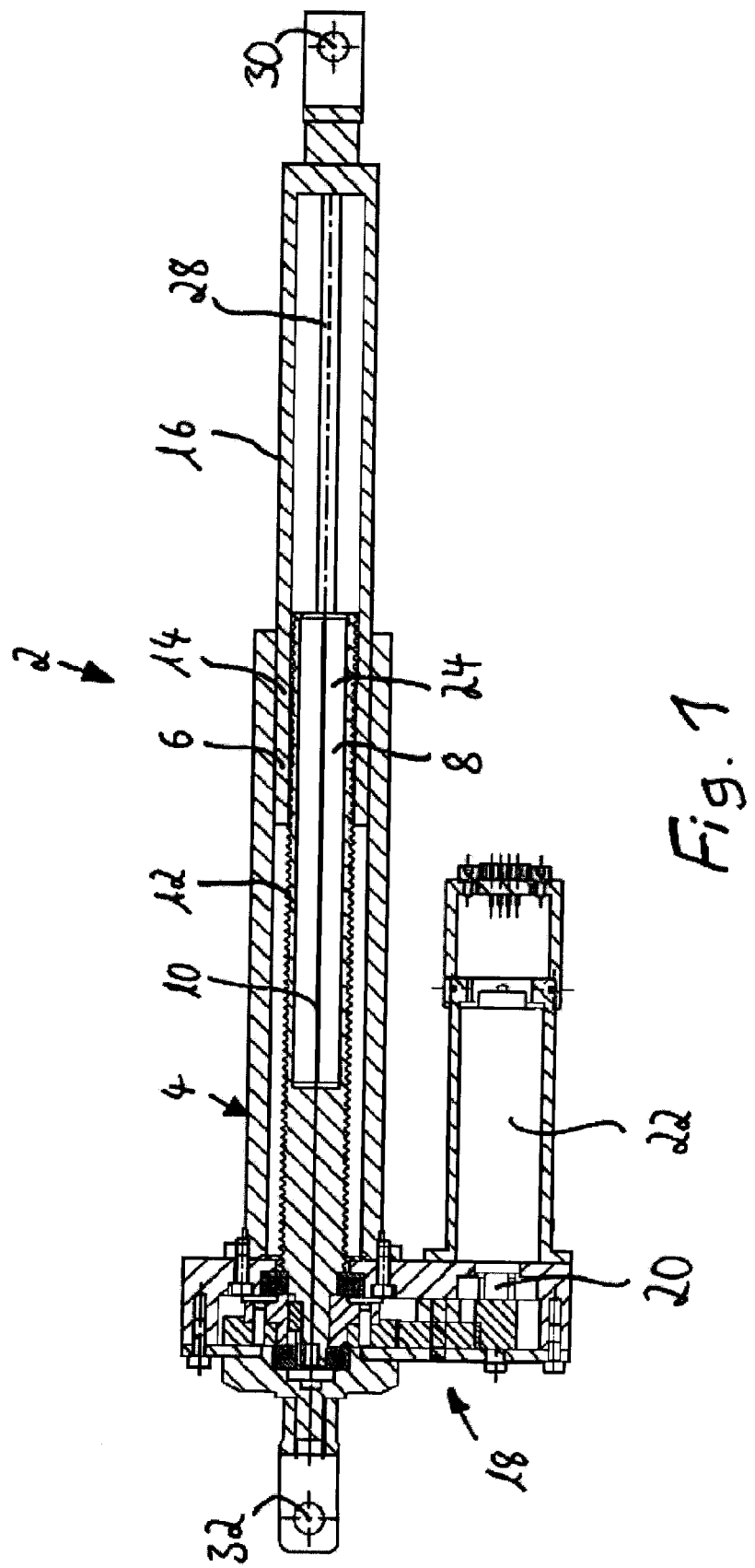
FIG. 1 is a side view in section of an embodiment example of an adjusting drive according to the invention.

An embodiment example of an adjusting drive 2 for adjusting a first structural component part relative to a second structural component part is shown in a side view in partial section in FIG. 1. The second structural component part can be, for example, a hatch to be adjusted relative to a base body forming the first structural component part.

The adjusting drive 2 has a housing 4 at which or in which are arranged a linear drive 6 and a piston-cylinder unit 8 in the form of a gas spring.

The linear drive 6 in one embodiment is constructed as a spindle drive that has a threaded spindle 12 which is supported so as to be rotatable around an axis of rotation 10 and on which a spindle nut 14 is arranged so as to be fixed with respect to relative rotation and movable in axial direction of the threaded spindle 12. The spindle nut 14 in one embodiment is formed by a portion of a stroke tube 16 provided with an internal thread.

The threaded spindle 12 communicates with a driven shaft 20 of an electric motor 22 via a reduction gear unit 18 to form a rotationally driving connection. The construction and manner of functioning of a corresponding reduction gear unit are well known to the person skilled in the art and are therefore not explained in more detail herein.

Power supply and actuators for actuating the electric motor 22 are likewise well known to the person skilled in the art and are therefore also not described more fully.

In one embodiment, the threaded spindle 12 is constructed as a hollow spindle, a cylinder 24 of the gas spring 8 being received in the interior thereof. The cylinder 24 is supported in the threaded spindle 12 by its end remote of the piston rod 28, while the free end of the piston rod 28 is connected to the stroke tube 16.

Articulation points 30, 32 for connecting the adjusting drive 2 to structural component parts which are to be adjusted relative to one another are provided at the free end of the stroke tube 16 and at the end of the housing 4 remote of the stroke tube 16.

According to one embodiment of the invention, the adjusting drive 2 has a control for controlling the adjusting speed of the adjusting drive 2 depending upon the adjusting path. The adjusting path is the path traveled by the stroke tube 16 between the end limits of the adjusting movement. The adjusting speed is, according to one embodiment of the invention, the speed at which the stroke tube 16 moves along an adjustment axis defined by the rotational axis 10 of the threaded spindle 12. In this embodiment example, the control has pneumatic control that will be described in more detail in the following referring to FIG. 2.

Figure 2:
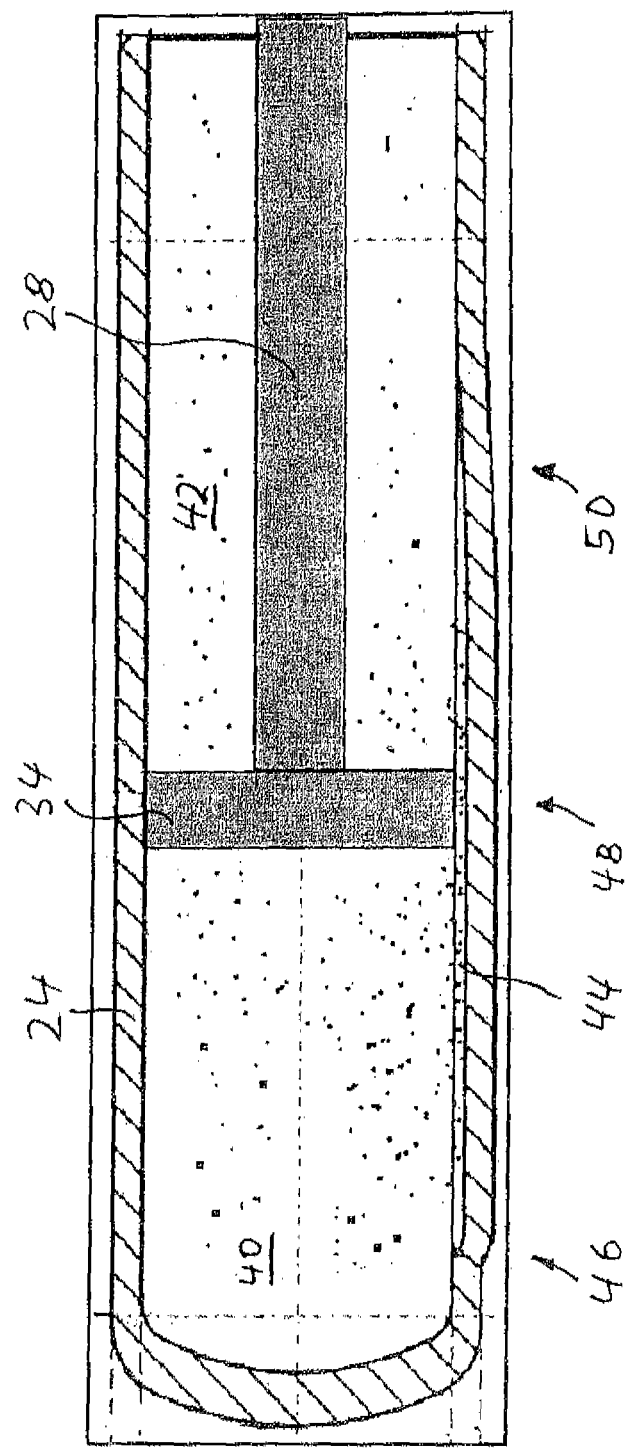
FIG. 2 is a sectional view of a detail of the adjusting drive according to FIG. 1.

FIG. 2 shows a sectional view of a detail of the adjusting drive 2 in the region of the piston 34 of the gas spring 8. In one embodiment, shown in the drawing, the cylinder 24 is divided into two sub-spaces 40, 42 by the piston 34.

In one embodiment, the pneumatic control has a flow channel 44 formed in one embodiment example by a groove introduced into the inner wall of the cylinder 24. As can be seen from FIG. 2, the cross section of the groove 44 increases in a first region 46 at the start of the adjusting path, remains constant in a second portion 48, and then decreases again in a third portion 50 in the region of the end of the adjusting path. The flow channel or groove 44 forms an adjusting path-dependent bypass through which the displaced gas can flow between the sub-spaces 40, 42.

The adjusting drive 3 according to one embodiment of the invention functions in the following manner:

For a structural component part connected to articulation point 30 to be adjusted toward the right in FIG. 1 relative to a structural component part connected to articulation point 32, the electric motor 22 drives the threaded spindle 12 in such that the spindle nut and, therefore, the stroke tube 16 moves toward the right in FIG. 1. In so doing, the piston 34 of the gas spring 8 is carried along so that gas flows out of sub-space 42 toward the left in FIG. 2 into sub-space 40.

At the start of the adjusting movement, the piston 34 arrives in the first portion 46 in which the groove 44 starts and its cross section increases toward the right in FIG. 2 and remains constant in the second portion 48.

As long as the piston 34 moves in the second portion in which the cross section of the groove 44 is constant, gas flows from the sub-space 42 via the groove 44 into sub-space 40, wherein the piston 34 moves at a constant speed.

When the piston 34 arrives in the third portion 50 in which the cross section of the groove 44 gradually decreases, the adjusting speed of the stroke tube 16 gradually decreases so that the stroke tube 16 is braked smoothly at the end of the adjusting movement.

As a result, the movement of the piston 34 and, therefore, of the stroke tube 16 accelerates or slows, respectively, in the portions in which the cross section of the groove 44 changes. The acceleration of the piston 34 and, therefore, of the stroke tube 16 can be selected within broad limits by corresponding dimensioning of the change in cross section of the groove 44. Accordingly, in the third portion 15, the gas spring 8 acts as a damper for the adjusting drive 2.

After an adjustment has been carried out, a favorable ratio of force results in the adjusting direction with respect to the structural component parts adjusted relative to one another in that the gas spring 8 forms a static force accumulator reinforcing the linear drive 6.

Resetting from the adjusted position, i.e., toward the left in FIG. 1, can be carried out while the drive is switched on, but under the influence of the force of gravity of an adjusted structural component part insofar as the spindle drive formed by the threaded spindle 12 and spindle nut 14 is not self-locking. The gas spring 26 forms a damper when resetting. The adjusting speed increases gradually as the piston 34 moves in the region of the third portion 50 of the groove 44 and remains substantially constant as the piston 34 moves in the region of the second portion 48 of the groove 44. When the piston 34 arrives in the region of the first portion 46, the speed of the piston 34 decreases again.

The invention accordingly provides an adjusting drive 2 suitable for a wide variety of applications and designed in a particularly economical way particularly when using a pneumatic-mechanical control such as is formed, for example, by the groove 44.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An adjusting drive for adjusting a first structural component part relative to a second structural component part, comprising:
    a linear drive;
    a piston-cylinder unit connected in parallel with the linear drive and configured to be driven by the linear drive; and
    a control comprising a pneumatic control element and configured to control an adjusting speed of the adjusting drive based upon an adjusting path,
    wherein the pneumatic control element further comprises at least one flow channel formed in an inner wall of a cylinder of the piston-cylinder unit,
    wherein a cross section of the flow channel changes at least partially in axial direction of the cylinder.

2. The adjusting drive according to claim 1, wherein the flow channel has at least one groove.

3. The adjusting drive according to claim 2, wherein the cross section of the flow channel increases at least partially in a region of a start of the adjusting path.

4. The adjusting drive according to claim 1, wherein the cross section of the flow channel increases at least partially in a region of a start of the adjusting path.

5. The adjusting drive according to claim 4, wherein the cross section of the flow channel decreases at least partially in a region of an end of the adjusting path.

6. The adjusting drive according to claim 5, wherein the linear drive is a spindle drive.

7. The adjusting drive according to claim 1, wherein the cross section of the flow channel decreases at least partially in a region of an end of the adjusting path.

8. The adjusting drive according to claim 1, wherein the linear drive is a spindle drive.

9. The adjusting drive according to claim 8, wherein a threaded spindle of the spindle drive is constructed as a hollow spindle, and in that the piston-cylinder unit is arranged in the hollow spindle.

10. The adjusting drive according to claim 1, wherein the flow channel has at least one groove.

* * * * *